United States Patent [19]

Lester

[11] 4,017,643
[45] Apr. 12, 1977

[54] PROCESS FOR STANDARDIZING MILK BY MONITORING THE FAT CONTENT OF THE BLENDED MILK PRODUCT

[75] Inventor: Joseph H. Lester, Gresham, Oreg.

[73] Assignee: Western Food Equipment Company, Portland, Oreg.

[22] Filed: Apr. 17, 1975

[21] Appl. No.: 568,865

[52] U.S. Cl. .............................. 426/231; 426/491
[51] Int. Cl.² .......................................... A23C 7/00
[58] Field of Search ................. 426/231, 580, 491; 137/625.28, 110; 73/196; 233/19, 21; 210/514, 515

[56] References Cited

UNITED STATES PATENTS

| | | | |
|---|---|---|---|
| 2,264,665 | 12/1941 | Hall | 426/491 |
| 2,567,898 | 9/1951 | Staaf | 426/231 |
| 2,650,879 | 9/1953 | Peebles | 426/580 |
| 2,752,815 | 7/1956 | Batchelor | 426/231 |
| 2,860,988 | 11/1958 | Keville | 426/491 |
| 3,364,038 | 1/1968 | Bartlett | 426/491 |
| 3,829,584 | 8/1974 | Seiberling | 426/231 |
| 3,983,257 | 9/1976 | Malmberg | 426/231 |

Primary Examiner—Hiram H. Bernstein
Attorney, Agent, or Firm—Klarquist, Sparkman, Campbell, Leigh, Hall & Whinston

[57] ABSTRACT

A process for standardizing milk is disclosed, which includes continuous separation of raw milk into cream and skimmed milk and immediate, continuous reblending of a portion of the cream with the skimmed milk to provide blended milk, while the remainder of the cream is recovered as a byproduct. The blended milk is continuously sampled and tested to determine its fat content and the actual fat content is continuously compared with a predetermined fat content. The amount of cream reblended with the skimmed milk is automatically regulated to provide the desired fat content in the blended milk product. Apparatus employed includes a separator, conduits for separately removing skimmed milk and cream from the separator which are interconnected to mix the desired portion of cream with the skimmed milk, a milk sampler for withdrawing blended milk samples, a milk fat content tester, an adjustable valve in the cream removal conduit, and a valve controller for controlling the rate of withdrawal of byproduct cream in response to the fat content of the blended milk determined in the tester.

4 Claims, 1 Drawing Figure

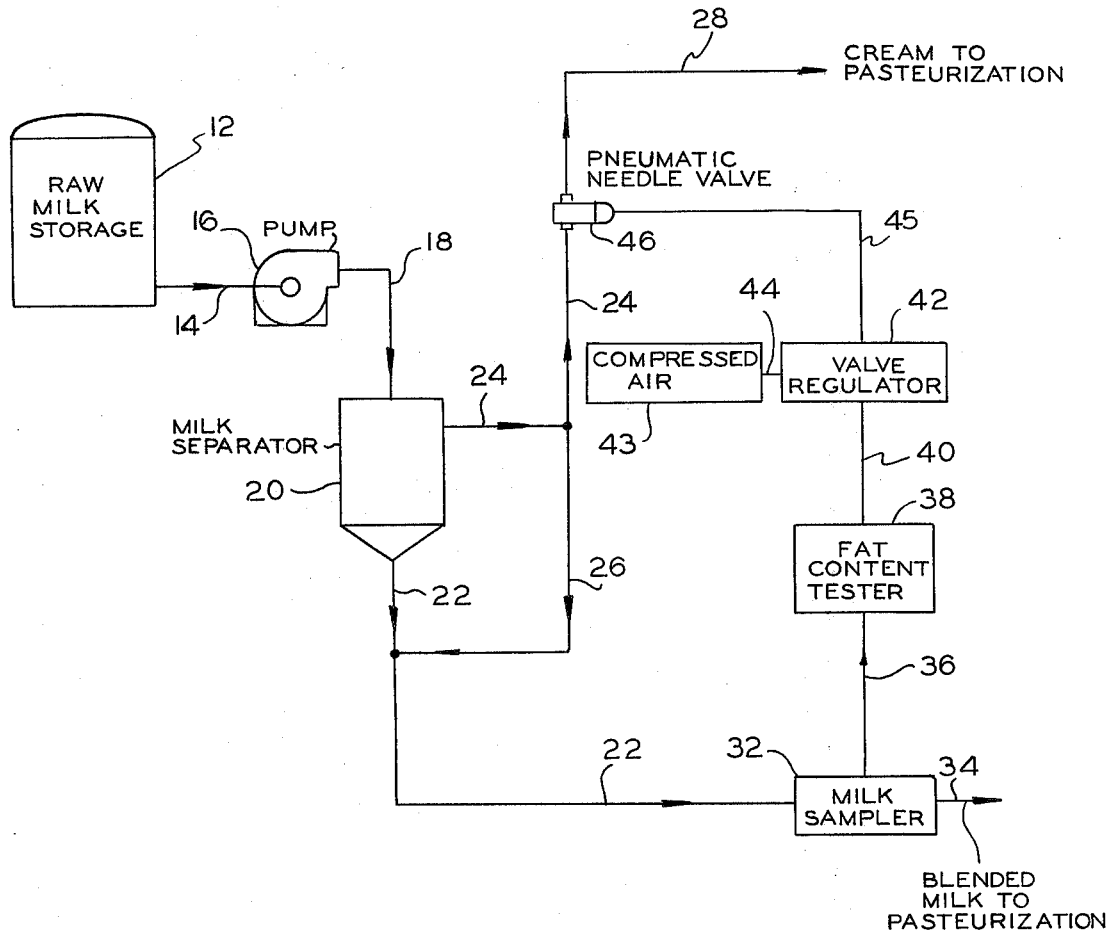

ived at 4,017,643

PROCESS FOR STANDARDIZING MILK BY MONITORING THE FAT CONTENT OF THE BLENDED MILK PRODUCT

BACKGROUND OF THE INVENTION

The present invention relates to a system for standardizing milk. In one aspect, the invention concerns a method for producing blended milk with a lower fat content than raw milk. In another aspect, the invention relates to milk standardizing apparatus.

Raw, unprocessed milk normally has a fat content higher than is desired in retailed milk, and is accordingly processed to remove a portion of the cream to provide a blended milk product having the desired standard fat content. Previously, standardizing has been accomplished by completely separating raw milk into a cream fraction containing substantially all of the fat and a skimmed milk fraction, which is essentially fat free. The skimmed milk and cream are piped to storage containers. To provide blended milk having a desired fat content, the stored supplies of skimmed milk and cream have been reblended after determination of the fat content by mixing with the skimmed milk the amount of cream needed to provide the fat content desired in the reblended milk.

Conventional standardizing operations require large, expensive skimmed milk and cream storage tanks, as well as pumps and piping equipment. It is relatively difficult to keep the separately stored cream and skimmed milk in a sanitary condition, since they are passed through complex piping and storage facilities and are not normally pasteurized until after reblending. For this reason, degradation or deterioration of the separated skim and cream fractions may be a problem in previous standardizing methods. Further, conventional systems, including one-line standardizing systems, have not generally produced blended milk as precisely blended as is desirable.

The present standardizing method and apparatus obviate the expense and difficulty of prior art standardizing operations and provide a precisely blended product.

SUMMARY OF THE INVENTION

It is an object of the present invention to provide a continuous milk standardizing system.

It is another object of this invention to provide a method for standardizing raw milk to produce blended milk having a desired fat content in a less complex and less expensive manner than previous standardizing methods.

It is further object of the present invention to provide a milk standardizing system which allows precise control of the fat content in the blended milk product.

It is a further object of the present invention to provide a milk standardizing method and standardizing apparatus which facilitate sanitary milk processing.

It is a further object of the present invention to provide a milk standardizing method and standardizing apparatus which accomplish milk standardization without degradation or deterioration of cream, skimmed milk or blended milk.

It is a further object of this invention to eliminate complex and expensive from a milk standardizing operation.

The standardizing method and apparatus of the present invention attain the foregoing objectives by separating raw milk into skimmed milk and cream fractions which are separately discharged from a raw milk separator, the discharge conduits being interconnected to allow part of the cream fraction to flow directly into admixture with the skimmed milk to form blended milk. The rest of the cream is discharged from the system at a regulated rate. The blended milk is passed directly to pasteurization after its fat content is tested, eliminating expensive milk storage. By employing the results of the tests of the fat content of the blended milk to regulate the amount of cream separately withdrawn from the system, so that the desired amount of cream is reblended with the skimmed milk, a blended milk having an accurately standardized fat content is produced.

Further objects, embodiments and advantages of the present process and apparatus will be apparent to those skilled in the art from the following description of the drawing and detailed description of the preferred embodiment of this invention.

DESCRIPTION OF THE DRAWING

The attached drawing is a schematic representation of a preferred embodiment of the method and apparatus of the present invention.

DESCRIPTION OF THE PREFERRED EMBODIMENT

Referring to the drawing, raw milk, which may be stored in a conventional storage container 12, is withdrawn continuously through a conduit 14 by a pump 16 and transmitted through a conduit 18 to a milk separation zone comprising a continuous, centrifugal milk separator 20. The milk is preferably introduced continuously to the separator 20 at a constant flow rate, by the use of the pump 16, to provide even separation and blending.

Raw milk, or whole milk as received from the dairy, normally has a fat content of about 4 to 4.1 percent. Commercially retailed milk usually contains from 2 to about 3.8 percent fat. In the separator 20, raw milk is continuously separated into a skimmed milk fraction, containing essentially no fat, and a cream fraction containing essentially all the fat. The skimmed milk fraction is continuously discharged from the separator 20 through a conduit 22, and the cream fraction is continuously discharged from the separator 20 through another conduit 24.

One portion of the cream flows from the conduit 24 into a conduit 28 and is withdrawn from the process as a byproduct, as more fully described below. Another portion of the cream flows through a conduit 26 and provides the fat required in the blended milk product.

The conduit 26 is connected to the conduit 22. Blended milk is thus formed automatically and continuously by admixture of the stream of milk within conduit 22 with the cream from the conduit 26. The blended milk stream in the conduit 22 downstream from the connection of the conduit 26 with the conduit 22 is passed through a milk sampler 32 in which samples of the blended milk are continuously removed from the blended milk stream, the main stream of milk being conducted by a conduit 34 to further conventional milk processing equipment. The samples removed from the primary blended milk stream in the sampler 32 are continuously passed from the sampler 32 through a conduit 36 to a suitable fat content tester 38. This tester is preferably of the light reflection type, such as a Milko-Tester, distributed by Foss America, Inc., Fishkill, New York, and generates an electrical signal which varies with the fat content of the milk sample analyzed. Other types of analyzers can obviously be used, as will be apparent to those skilled in the art.

The electric signal from the tester 38 is transmitted through a signal transmitting connection 40 to a valve regulator 42. The regulator 42 compares the signal from the connection 40 with a preset electrical signal generated by the regulator 42. The magnitude of this present signal is determined by manually adjusting a signal generating circuit in the regulator 42 to a predetermined signal level corresponding to a desired fat content. The regulator 42 produces an electric control signal which varies with the difference between the signals compared in this device. The control signal is employed to control the pressure of air which is transmitted from a source of compressed air 43, an air conduit 44, and the regulator 42 through an air conduit 45 to a pneumatically controlled needle valve 46 in the conduit 24 downstream from its connection with the conduit 26. The valve 46 is turn controls the rate of flow of the cream through the conduit 24 into the conduit 28. A suitable apparatus for comparing the actual and predetermined fat contents and for regulating the amount of cream allowed to flow through the conduit 28, as accomplished by the regulator 42, is the Foxboro Model 69PA-1 sold by the Foxboro, Company, Foxboro, Massachusetts. A suitable pneumatically operated, adjustable needle valve 46 is manufactured by Triclover Division of the Ladish Company, Kenosha, Wisconsin.

If the fat content of the blended milk in the conduit 22 increases over the desired level, the control signal will change the air pressure transmitted to the pneumatic valve 46 so as to change the opening of the valve is a direction to increase the opening, thereby decreasing the fat content of the blended milk by reducing the amount of cream flowing into conduit 22. Similarly, the control signal will decrease the opening of the valve 46 to increase the flow of cream into conduit 22, if the fat content in the blended milk decreases below the desired level, it being understood that the flow of cream through the conduit 26 will be suitably restricted so that a substantial portion of the cream will flow through the conduit 24 when the valve 46 is open. Although the preferred position of the controlled valve 46 is in the conduit 24 as shown in the drawing, it is apparent that this valve may be positioned in the conduit 26 if the electrical signal from the fat content tester 38 to the valve regulator 42 is inverted and flow of cream through the conduit 28 is suitably restricted.

It will be apparent from the foregoing that cream is continuously blended with skimmed milk to provide the fat content of the blended milk in the present process solely by the use of an automatically adjusted valve to regulate the amount of cream withdrawn from the process. Since the conduit used for discharging cream from the separator and the conduit used for discharging skimmed milk from the separator are connected together, any cream which is not allowed to flow out of the process as a byproduct automatically flows into admixture with the skimmed milk to produce blended milk.

By immediately reblending the skimmed milk and cream to product blended milk, the likelihood of exposure of the skimmed milk, the cream or the blended milk to possibly unsanitary piping and storage facilities is eliminated. The blended milk can be sent immediately from blending to pasteurization, as can the cream byproduct. Elimination of the need for piping and storage containers also results in substantial economic and space savings in the present system, as compared to previous standardizing systems.

The preferred embodiment of the present invention having been described, the generally broad scope of the invention and alternatives, modifications and variations thereof will be apparent to those skilled in the art.

I claim:

1. A process for producing a blended milk product having a predetermined fat content from raw milk, which comprises the steps of:
    a. continuously introducing a stream of said raw milk into a milk separation zone and separating said raw milk stream to provide a skimmed milk fraction and a cream fraction;
    b. continuously and separately withdrawing said skimmed milk fraction and said cream fraction from said separation zone;
    c. continuously splitting said cream fraction into a first portion and a second portion and removing said first portion from the process;
    d. continuously admixing said second portion with said skimmed milk fraction to provide a blended milk stream;
    e. continuously testing said blended milk stream to determine the fat content thereof;
    f. continuously comparing the fat content of said blended milk stream with said predetermined fat content; and
    g. continuously controlling the amount of said second portion of cream to provide said blended milk product.

2. The process of claim 1 wherein said raw milk stream is continuously introduced into said separation zone at a constant flow rate.

3. The process of claim 1 wherein said testing includes separating a minor portion of said blended milk stream from a major portion thereof and determining the fat content of said minor portion.

4. The method of claim 1 in which the amount of said second portion of cream is controlled by controlling the amount of cream removed from the process in said first portion.

* * * * *